US009144760B2

(12) United States Patent
Chase et al.

(10) Patent No.: US 9,144,760 B2
(45) Date of Patent: Sep. 29, 2015

(54) LIQUID DRAINAGE FROM COALESCING FILTER MEDIUM WITH DRAINAGE CHANNELS

(71) Applicants: George Chase, Wadsworth, OH (US); Shagufta Patel, Akron, OH (US)

(72) Inventors: George Chase, Wadsworth, OH (US); Shagufta Patel, Akron, OH (US)

(73) Assignee: The University of Akron, Akron, OH (US)

( * ) Notice: Subject to any disclaimer, the term of this patent is extended or adjusted under 35 U.S.C. 154(b) by 47 days.

(21) Appl. No.: 13/935,020

(22) Filed: Jul. 3, 2013

(65) Prior Publication Data
US 2014/0007771 A1 Jan. 9, 2014

Related U.S. Application Data

(60) Provisional application No. 61/667,553, filed on Jul. 3, 2012.

(51) Int. Cl.
*B01D 46/00* (2006.01)
*B01D 46/24* (2006.01)

(52) U.S. Cl.
CPC ............ *B01D 46/0031* (2013.01); *B01D 46/24* (2013.01); *B01D 2275/30* (2013.01)

(58) Field of Classification Search
CPC ...... B01D 17/10; B01D 17/045; B01D 39/04; B01D 39/06
USPC ............ 55/337, 419, 462, 464, 486; 95/2, 67, 95/286; 210/488, 307, 435, 489, 490, 491, 210/492, 799
See application file for complete search history.

(56) References Cited

U.S. PATENT DOCUMENTS

| 4,102,785 | A | * | 7/1978 | Head et al. | 210/767 |
|---|---|---|---|---|---|
| 4,759,782 | A | | 7/1988 | Miller | |
| 4,818,257 | A | * | 4/1989 | Kennedy et al. | 95/286 |
| 5,129,923 | A | | 7/1992 | Hunter | |
| 5,252,207 | A | * | 10/1993 | Miller et al. | 210/335 |
| 5,443,724 | A | * | 8/1995 | Williamson et al. | 210/323.2 |
| 6,419,721 | B1 | | 7/2002 | Hunter | |
| 7,416,576 | B2 | * | 8/2008 | Ziebold et al. | 55/486 |

(Continued)

FOREIGN PATENT DOCUMENTS

| EP | 0618835 B1 | 10/1995 |
|---|---|---|
| WO | 2008125885 A2 | 10/2008 |
| WO | 2008146045 A1 | 12/2008 |

OTHER PUBLICATIONS

Patel, Shagufta; Dissertation—Improving Performance and Drainage of Coalescing Filters; Published Aug. 2011.
Patel, Shagufta & Chase, George; Gravity orientation and woven drainage structures in coalescing filters; Separation and Purification Technology; Sep. 7, 2010.

(Continued)

*Primary Examiner* — Duane Smith
*Assistant Examiner* — Minh-Chau Pham
(74) *Attorney, Agent, or Firm* — Renner Kenner; Greive Bobak; Taylor & Weber

(57) ABSTRACT

A coalescing filter includes a coalescing filter medium having an entrance face and an exit face and a surface energy, the coalescing filter also having a drainage channel in the coalescing filter medium, the drainage channel being a woven or non-woven fiber construct having a pore size greater than the pore size of said coalescing filter medium and having a surface energy that is lower than the surface energy of the coalescing filter medium, the drainage channel extending at a downward angle relative to the direction from the entrance face to the exit face.

18 Claims, 6 Drawing Sheets

(56) References Cited

U.S. PATENT DOCUMENTS

| | | | |
|---|---|---|---|
| 7,815,714 B2* | 10/2010 | Taylor et al. | 95/67 |
| 8,360,251 B2* | 1/2013 | Wieczorek et al. | 210/488 |
| 2006/0207234 A1* | 9/2006 | Ward et al. | 55/524 |
| 2006/0277877 A1* | 12/2006 | Shields | 55/486 |
| 2007/0062887 A1* | 3/2007 | Schwandt et al. | 210/799 |
| 2010/0024639 A1* | 2/2010 | Taylor | 95/2 |
| 2010/0200512 A1* | 8/2010 | Chase et al. | 210/708 |
| 2011/0084028 A1* | 4/2011 | Stanfel et al. | 210/708 |
| 2011/0124941 A1* | 5/2011 | Verdegan et al. | 585/818 |
| 2012/0261358 A1* | 10/2012 | Stanfel et al. | 210/799 |
| 2013/0205726 A1* | 8/2013 | Wada et al. | 55/337 |
| 2014/0008286 A1* | 1/2014 | Jiang et al. | 210/338 |
| 2014/0116947 A1* | 5/2014 | Chase et al. | 210/665 |
| 2014/0275692 A1* | 9/2014 | Patel et al. | 585/818 |
| 2014/0311963 A1* | 10/2014 | Bortnik et al. | 210/335 |

OTHER PUBLICATIONS

Patel, Shagufta; Kulkarni, Prashant; Patel, Sarfaraz; Chase, George; The effect of surface energy of woven drainage channels in coalescing filters; Separation and Purification Technology; Nov. 26, 2011.

Patel, Shagufta & Chase, George; Nanofiber augmented glass fiber filter media with woven drainage channels; Presentation at American Filtration & Separation Society Fall 2012 Conference and Exposition; Oct. 2012.

Patel S. U., Kulkarni P.S., Patel S.U., Chase G.G., Glass fiber coalescing filter media augmented with polymer nanofibers and modified with angled drainage channels; Separation and Purification Technology; Submitted May 31, 2013.

Shagufta U. Patel , Prashant S. Kulkarni , Sarfaraz U. Patel & George G. Chase: Coalescence Filter Media with Drainage Channels, Drying Technology: An International Journal, 31:2, 185-192; (2013).

\* cited by examiner

LIQUID DRAINAGE FROM COALESCING FILTER MEDIUM WITH DRAINAGE CHANNELS

CROSS-REFERENCE TO RELATED APPLICATIONS

The present invention claims priority to U.S. Provisional Patent Application No. 61/667,553, filed Jul. 3, 2012, incorporated herein by reference.

FIELD OF THE INVENTION

The present invention relates to coalescing filters for removing liquid droplets from a gas stream. The present invention further relates to coalescing filters having drainage channels where the channels allow coalesced liquid droplets to drain from the filter. The present invention further relates to coalescing filters comprising coalescing filter medium having drainage channels that extend at a downward angle relative to a direction extending orthogonal to the direction of gravity, the drainage channels being a woven or non-woven fiber construct having a surface energy that is lower than the surface energy of the coalescing filter medium. In particular embodiments, this angle is from 40 to 50 degrees off of the orthogonal, and, in a specific embodiment the angle is 45 degrees.

BACKGROUND OF THE INVENTION

Typical coalescing filters are employed to separate liquid out of a gas stream containing a liquid component. As the gas passes through the filter, the liquid component is captured and coalesced by the filter. As more and more of the liquid component is captured, the droplets that are captured combine to form larger droplets. When the coalesced droplets are sufficiently large, gravity will allow the large droplets to exit the filter.

Coalescing filters have good separation efficiency for removing oil droplets from air stream. At the same time, most coalescing filters have significant pressure drop, which represents the energy expenditure. Usually, filters having higher separation efficiency also have higher pressure drop. This occurs because the filter loads up with liquid droplets. The liquid droplets occupy the porous space inside the filter medium; therefore, the filter media becomes saturated with the liquid load-up, which causes the pressure drop of the filter medium to increase.

In order to effectively continue the gas flow through the filter, the captured liquid must move through the filter and ultimately exit the filter, because the coalesced liquid reduces the pore space available for gas flow and thus causes an increase in pressure drop. To aid in the draining of the coalesced droplets, filters have been designed that utilize drainage channels at the inlet or outlet surfaces of the filters.

These drainage channels collect the coalesced liquid and drain it to an exit location. However, these filters often experience issues with liquid drainage and hold-up. Filters that do not effectively drain the coalesced liquid experience distorted gas flows, causing localized filter plugging and reducing the life of the filter.

Some coalescing filters include layers having different fiber properties, such as fiber diameter and surface energy. However, these filters often experiences issues with the liquid droplets being re-entrained into the gas flow. These filters also do not always provide sufficient pressure drop and flow characteristics.

Thus, a need in the art exists for an improved coalescing filter. The current invention is an improved coalescing filter that offers improved drainage, which results in more effective pressure drop and flow characteristics. According to the present invention, a coalescing filter is provided that comprises a drainage channel that extends at a downward angle, where the drainage channel has a higher porosity than the coalescing filter medium.

SUMMARY OF THE INVENTION

In a first embodiment, the present invention provides a coalescing filter comprising a coalescing filter medium having an entrance face and an exit face and a pore size and a surface energy; a drainage channel in said coalescing filter medium, said drainage channel being a woven or non-woven fiber construct having a pore size greater than the pore size of said coalescing filter medium and having a surface energy that is lower than the surface energy of said coalescing filter medium, said drainage channel extending at a downward angle relative to the direction from said entrance face to said exit face.

In a second embodiment, the present invention provides a coalescing filter as in the first embodiment, wherein the drainage channel extends at a downward angle from 42 degrees or more to 48 or less degrees.

In a third embodiment, the present invention provides a coalescing filter as in either the first or second embodiment, wherein the drainage channel extends at a downward angle of 44 or greater to 46 or less degrees.

In a fourth embodiment, the present invention provides a coalescing filter as in any of the first through third embodiments, wherein the coalescing filter medium has an average pore size opening of from 10 microns or more to 20 microns or less.

In a fifth embodiment, the present invention provides a coalescing filter as in any of the first through fourth embodiments, wherein the drainage channel has an average pore size opening of from 200 microns or more to 1000 microns or less.

In a sixth embodiment, the present invention provides a coalescing filter as in any of the first through fifth embodiments, wherein the coalescing filter is to filter a liquid from a gas stream and the surface energy of said drainage channel is such that the liquid to be separated has a contact angle with the material of the drainage channel of 90 degrees or more.

In a seventh embodiment, the present invention provides a coalescing filter as in any of the first through sixth embodiments, wherein the coalescing filter is to filter a liquid from a gas stream and the surface energy of said drainage channel is such that the liquid to be separated has a contact angle with the material of the drainage channel of 110 degrees or more.

In an eighth embodiment, the present invention provides a coalescing filter as in any of the first through seventh embodiments, wherein the coalescing filter is to filter a liquid from a gas stream and the surface energy of said coalescing filter medium is such that the liquid to be separated has a contact angle with the material of the coalescing filter medium of 60 degrees or less.

In a ninth embodiment, the present invention provides a coalescing filter as in any of the first through eighth embodiments, wherein the coalescing filter comprises a plurality of drainage channels.

In a tenth embodiment, the present invention provides a coalescing filter as in any of the first through ninth embodiments, wherein any cross section taken in an orthogonal direction from said entrance face to said exit face cuts through at least one drainage channel.

In an eleventh embodiment, the present invention provides a coalescing filter as in any of the first through tenth embodiments, wherein the filter medium is made from glass fibers.

In a twelfth embodiment, the present invention provides a method of filtering a liquid component from a gas stream, the method comprising the steps of: providing a coalescing filter across a path of travel of a gas stream containing a liquid component, the coalescing filter including: a coalescing filter medium having an entrance face and an exit face and a porosity and a surface energy, and a drainage channel in said coalescing filter medium, said drainage channel being a woven or non-woven fiber construct having a pore size greater than the pore size of said coalescing filter medium and having a surface energy that is lower than the surface energy of said coalescing filter medium, wherein the drainage channel extends at a downward angle relative to a direction orthogonal to gravity.

In a thirteenth embodiment, the present invention provides a method of filtering a liquid component from a gas stream as in the twelfth embodiment, wherein said coalescing filter medium has a higher wettability of said liquid component than said drainage channel.

In a fourteenth embodiment, the present invention provides a method of filtering a liquid component from a gas stream as in either the twelfth or thirteenth embodiment, further comprising the steps of: coalescing said liquid component in said coalescing filter medium, and draining said liquid component through said drainage channel.

In a fifteenth embodiment, the present invention provides a method of filtering a liquid component from a gas stream as in any of the twelfth through fourteenth embodiments, wherein the contact angle of said drainage channel to a coalesced droplet of said liquid component is larger than the contact angle of said coalescing filter medium to a coalesced droplet of said liquid component.

In a sixteenth embodiment, the present invention provides a method of filtering a liquid component from a gas stream as in any of the twelfth through fifteenth embodiments, wherein said drainage channel has a liquid contact angle with said liquid component of 90 degrees or more.

In a seventeenth embodiment, the present invention provides a method of filtering a liquid component from a gas stream as in any of the twelfth through sixteenth embodiments, wherein said drainage channel has a liquid contact angle with said liquid component of 110 degrees or more.

In an eighteenth embodiment, the present invention provides a method of filtering a liquid component from a gas stream as in any of the twelfth through seventeenth embodiments, wherein said drainage channel is hydrophobic and further wherein said coalescing filter medium is hydrophilic.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

The present invention relates to a coalescing filter for removing liquid droplets from a gas stream. The present invention further relates to a coalescing filter including a coalescing filter medium having a drainage channel that facilitates the draining of coalesced liquid droplets from the filter. The present invention further relates to a coalescing filter having at least one drainage channel that extends at a downward angle relative to a direction extending orthogonal to the direction of gravity, the at least one drainage channel being a woven or non-woven fiber construct having a porosity that is larger than the porosity of the coalescing filter medium. In particular embodiments, this angle is from 40 to 50 degrees off of the orthogonal, and, in a specific embodiment the angle is 45 degrees.

Figure 1:
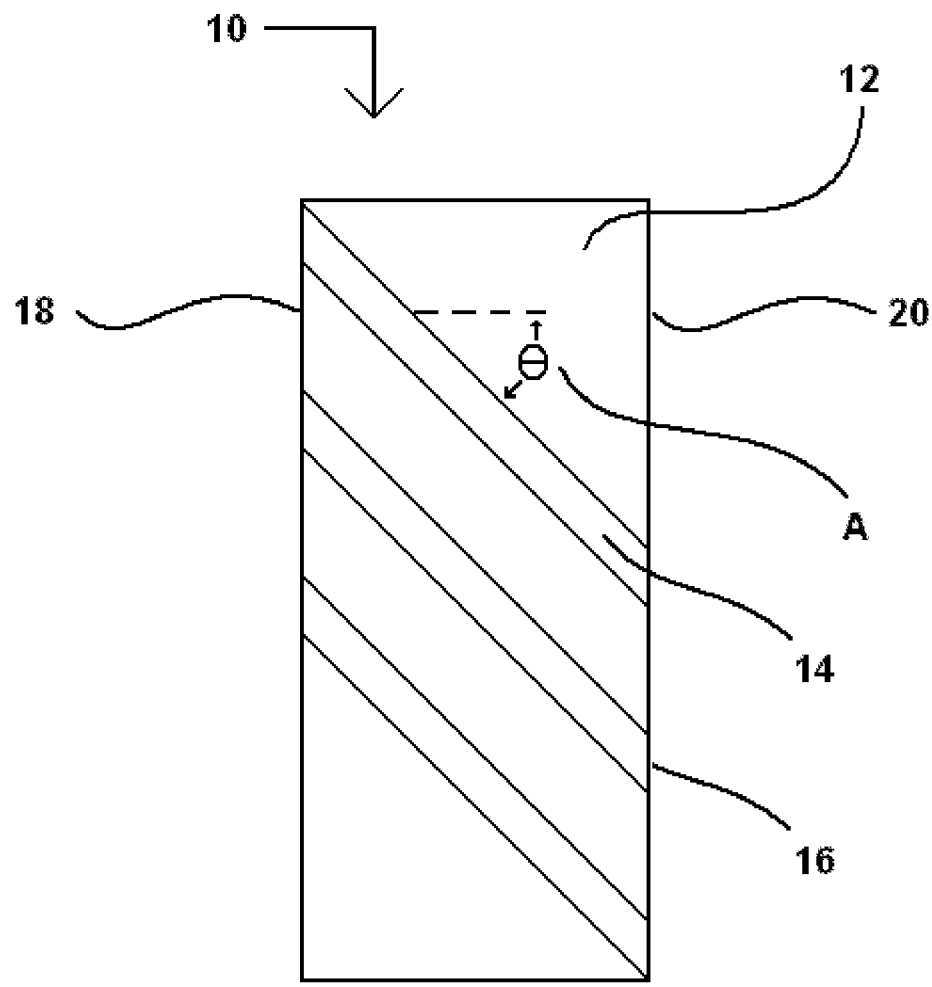
FIG. 1 is a schematic view of a coalescing filter having drainage channels extending at a downward angle.

With reference to FIG. 1, a coalescing filter 10 is provided. The coalescing filter 10 comprises a coalescing filter medium 12 having an entrance face 18 and an exit face 20. The coalescing filter medium 12 is formed of woven or non-woven fibers, and thus provides a porosity dependent upon the void space defined by the overlapping of fibers that forms the woven or non-woven structure. Drainage channels 14 are positioned in the coalescing filter medium 12 and extend, when the filter is positioned for use, at a downward angle A relative to a flow direction orthogonal to the direction of gravity. The drainage channels 14 are formed of woven or non-woven fibers as well, and porosity of the drainage channels 14 is higher than the porosity of the coalescing filter medium 12. Additionally, with respect to the liquid to be removed from a gas stream by the coalescing filter 10, the drainage channels 14 have lower wettability than the coalescing filter medium 12.

Coalescing filters of the present invention can have bed lengths shortened as compared to coalescing filters without drainage channels as taught herein. The bed length is the length that a gas has to travel before exiting the filter. Filters having a larger bed length generally result in a higher pressure drop across the filter. In one or more embodiments, a coalescing filter has a bed length of from 5 mm or more to 15 mm or less. In other embodiments, the bed length is 1 mm, 3 mm, or 20 mm.

The drainage channels 14 are offset at an angle A relative to a flow direction that is orthogonal to the direction of gravity. In one or more embodiments, the angle A is 45 degrees. In some embodiments, the drainage channels are all offset at the same angle, such that they are parallel. In other embodiments, the drainage channels are offset a different angles. In some embodiments, the drainage channels extend at a downward angle A of from 10 or more to less than 90 degrees. In other embodiments, the drainage channels extend at a downward angle A of from 30 degrees or more to 50 degrees or less. In other embodiments, the drainage channels extend at a downward angle A of from 42 degrees or more to 48 degrees or less, in other embodiments, from 44 degrees or more to 46 degrees or less. It has been unexpectedly found that selecting an angle A at or around 45 degrees provides a coalescing filter having improved performance characteristics, and, thus, in particular embodiments, the angle A is from 44 degrees or more to 46 degrees or less. In yet other embodiments, the drainage channels extend at a downward angle A of 45 degrees.

Coalescing filters of the present invention can have any number of drainage channels. In one or more embodiments, a coalescing filter comprises one drainage channel. In one or more embodiments, a coalescing filter comprises a plurality of drainage channels. Coalescing filters having more drainage channels provide more outlets for the coalesced liquid to collect and drain.

Figure 2:
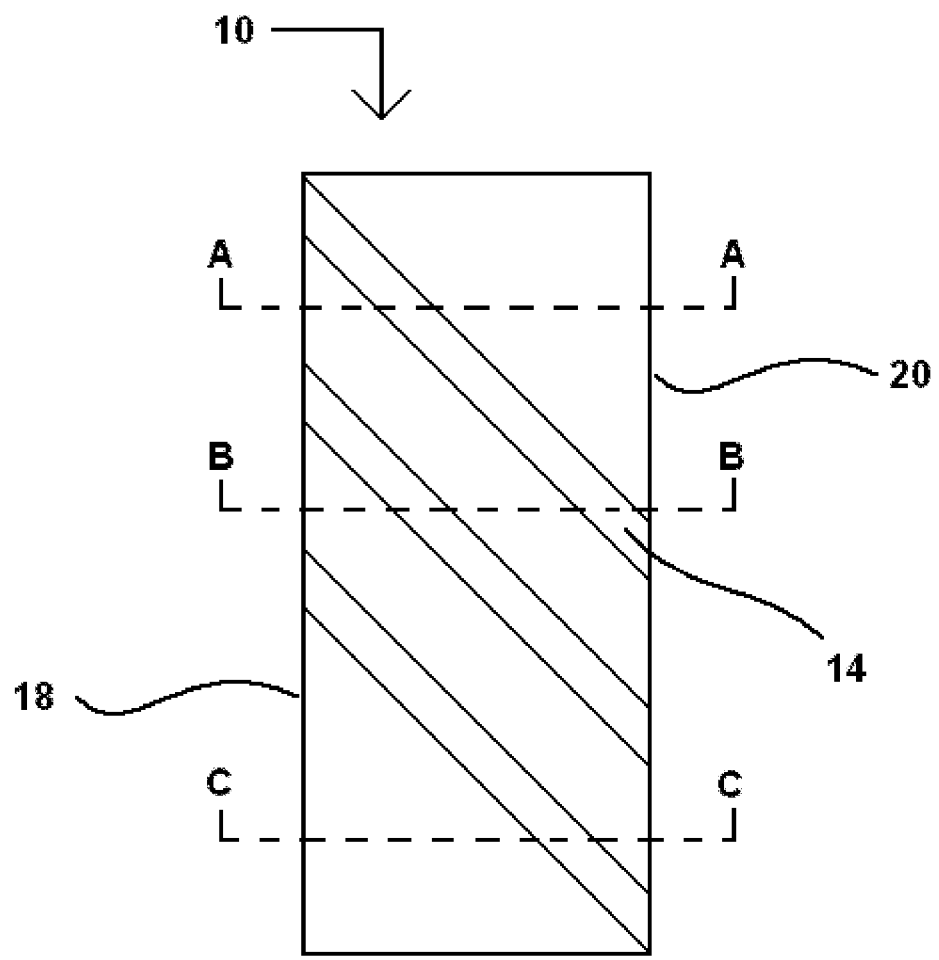
FIG. 2 is a schematic view of a coalescing filter wherein any cross section taken in an orthogonal direction from an entrance face to an exit face cuts through at least one drainage channel.

With reference to FIG. 2, one or more embodiments of the present invention provide a coalescing filter 10 wherein any gas flowing through the filter 10 in an orthogonal direction relative to gravity must cross though at least one drainage channel 14. In some embodiments, the entrance face 18 and exit face 20 will be positioned parallel to the direction of gravity such that the orthogonal direction relative to gravity will also be orthogonal to the entrance face 18 or exit face 20. As seen in FIG. 2, lines A-A, B-B, and C-C are all taken in an orthogonal direction from said entrance face 18 to said exit face 20, and cross through at least one drainage channel 14. With such a structure, it is difficult for liquid droplets to be carried across the filter 10 without encountering a drainage channel 14, and this can improve performance.

The thickness of a coalescing filter medium can generally be optimized based on optimizing the coalescence (largest drop sizes) while minimizing the pressure drop. The droplets encounter fibers that slow the droplets' motion and allow them to collide and coalesce with other drops. But when a drop becomes very large, it will tend to break into smaller drops as it passes down through the coalescing filter medium.

Therefore, there is a point where the rate of coalescence is balanced by the rate of breakage. After this point, making a thicker coalescing filter medium does not increase the drop size but will increase the pressure drop.

In one or more embodiments, the optimum thickness of a coalescing filter medium is about 1 cm. In other embodiments, the optimum thickness of a coalescing filter medium is from 0.8 cm or more to 1.2 cm or less.

The thickness of a drainage channel depends on whether the drainage channel acts as a slippery surface across which the liquid flows, or if the drainage channel acts as a conduit for liquid flow. If a drainage channel acts as a slippery surface, then the channel depth is not relevant. In preferred embodiments, a drainage channel acts as a conduit. In these embodiments, a drainage channel should be thick enough to allow the coalesced drops to move easily through the channel. In one or more embodiments, the thickness of a drainage channel is around one-tenth the size of a droplet (for a free standing droplet). In one or more embodiments, a drainage channel is 0.5 mm thick. In one or more embodiments, a drainage channel is from 0.4 mm or more to 0.6 mm or less thick.

A coalescing filter in accordance with this invention need only include a portion thereof with drainage channels as described herein. Thus, coalescing filters in accordance with this invention may include multiple filter layers, with at least one layer having drainage channels. These layers can exist as generally horizontal layers or generally vertical layers. In one or more embodiments, a coalescing filter has at least one layer having drainage channels and at least one layer that is devoid of drainage channels. In one or more embodiments, each layer has drainage channels. Layers can also be designed with any variety of properties known to one skilled in the art. Such properties to be manipulated include wettability, fiber diameters, porosity, fiber structure, and pore distribution.

Drainage channels provide pathways for coalesced liquid to rapidly flow out of the filter without compromising the capture efficiency. Therefore, the saturation, or hold-up of liquid, in the filter decreases. This reduces the pressure drop, and increases the quality factor and filter life.

The performance measure has several equivalent definitions such as filtration index, figure of merit, or quality factor. A higher quality factor indicates better filter performance. The quality factor is defined by:

$$QF = \frac{-\ln\left(\frac{C_{out}}{C_{in}}\right)}{\Delta P}$$

where $C_{out}$ and $C_{in}$ are the outlet and inlet particle concentrations respectively, and $\Delta P$ is the pressure drop across the filter.

The capture efficiency is given by:

$$n = \frac{[C_{in} - C_{out}]}{C_{in}}$$

where upstream and downstream concentrations are calculated by following formula:

$$C = \sum N_i \frac{\pi d_i^3}{6} \rho_{oil}$$

where C is the oil concentration, $N_i$ is the number of droplets, $d_i$ is the droplet diameter, and $\rho_{oil}$ is the oil density.

In use, a gas stream (continuous phase) containing liquid droplets (discontinuous phase) to be filtered therefrom travels in a direction from the entrance face 18 to the exit face 20, across the bulk of the coalescing filter medium 12. As the liquid droplet-containing gas stream travels across the coalescing filter medium 12, liquid droplets coalesce on fibers of the coalescing filter medium 12 and the fibers of the drainage channels 14. This is a continuous process, with drops constantly coalescing and traveling further through the medium, such that drops coalescing upstream are constantly forced downstream toward the exit face 20 through the pores of the coalescing filter medium 12, thus encountering and further coalescing with other drops collected along the flow direction. Downstream, larger and larger coalesced droplets are created and eventually coalesced drops encounter and further coalesce at a drainage channel 14. As more and more liquid droplets develop and coalesce in the drainage channels 14, the combined droplets reach a certain critical size and then overcome the surface tension of the fibers of the drainage channel and are drained from the coalescing filter 10 under the force of gravity and the pressure of the upstream flowing gas stream.

Given the relative properties of wettability and porosity as mentioned above, the drainage channels 14 provide an easier outlet for the coalesced droplets to drain from the coalescing filter 10 than if the coalesced droplets had to drain down through the coalescing filter medium 12. The coalesced droplets travel down the drainage channels 14 to the outlets 16 of the drainage channels 14, at which point they drain from the coalescing filter 10.

Aspects of the coalescing filters of this invention will now be described in greater detail. It should be noted that the specific materials and the specific process conditions disclosed in the following disclosures are given only as examples within the scope of the invention, and this invention should not be limited to these materials or process conditions as such.

In one or more embodiments, the coalescing filter medium 12 is formed of woven or non-woven fibers, and thus provides a porosity dependent upon the void space defined by the woven or non-woven overlapping of fibers. In some embodiments, the fibers are selected from the group consisting of glass fibers, polymeric fibers, ceramic fibers, metal fibers, natural fibers such as cellulose, and synthetic fibers. Suitable woven fibers may be chosen from aliphatic or semi-aromatic polyamides known generally as nylon, steel, cellulose, B-glass, and alumina. Suitable nonwoven fibers may be chosen from aliphatic or semi-aromatic polyamides known generally as nylon, steel, cellulose, B-glass, and alumina. In one or more embodiments, the coalescing filter medium 12 is made from a foam having interconnected pore channels.

In some embodiments, the coalescing filter medium is a non-woven fabric of polymeric fibers. In some embodiments, the non-woven coalescing filter medium is formed by nanofibers by gas jet process or electrospinning process.

In some embodiments, the coalescing filter medium is a woven fabric selected from plain weaves, twill weaves, satin weaves, and dutch weaves.

The diameters of the fibers within the coalescing filter medium can also be manipulated based on desired characteristics of a filter. The diameter of the fibers affects the pore opening sizes. Pore opening size is dependent on the fiber diameter and the amount of fibers. The fiber diameter also affects surface contact area between the droplets and the fibers. This in turn affects the capture of the droplets.

In some embodiments, the coalescing filter medium is formed of fibers of from 10 nanometer (nm) to 20 millimeters (mm) in diameter. In some embodiments, the coalescing filter medium is formed of fibers of from 100 nanometer (nm) to 15 millimeters (mm) in diameter, in other embodiments, from 500 nm to 10 mm in diameter, in other embodiments, from 800 nm to 7 mm in diameter, and, in other embodiments, from 1 mm to 5 mm in diameter. In some embodiments, the coalescing filter medium is formed of fibers of less than 20 mm in diameter. In some embodiments, the coalescing filter medium is formed of fibers of 15 mm or less in diameter, in other embodiments, of 10 mm or less in diameter, in other embodiments, of 7 mm or less in diameter, and, in other embodiments, of 5 mm or less in diameter. In some embodiments, the coalescing filter medium is formed of fibers of 100 nm or more in diameter, in other embodiments, of 500 nm or more in diameter, in other embodiments, of 800 nm or more in diameter, and, in other embodiments, of 1 mm or more in diameter.

The diameter distribution and rigidity of the fibers affects pore opening sizes within a coalescing filter and the efficiency of droplet capture from a gas stream. In some embodiments the coalescing filter has multiple layers of coalescing filter media along the direction of flow of the gas stream, with the different layers providing different properties. In some such embodiments, the fiber diameter and thus the pore size increases in an upstream to downstream direction such that the smaller pore size coalescing filter media layers capture the initial liquid droplets and permit passage therethrough toward the higher pore size layers that can better receive the liquid droplets as they continue to coalesce and grow in size.

In some embodiments, the drainage channels 14 are formed of woven or nonwoven fibers, and thus provide a porosity dependent upon the void space defined by the woven or non-woven overlapping of fibers. In some embodiments, the fibers are selected from the group consisting of glass fibers, polymeric fibers, ceramic fibers, and metal fibers. Suitable woven fibers may be chosen from polytetrafluoroethylene (PTFE), generally known by the brand name Teflon from DuPont, polypropylene, and fluorinated polymers such as poly(vinyldiene fluoride-co-hexafluoropropene (PVDF-HFP). Suitable non-woven fibers may be chosen from polytetrafluoroethylene (PTFE), generally known by the brand name Teflon from DuPont, polypropylene, and fluorinated polymers such as poly(vinyldiene fluoride-co-hexafluoropropene (PVDF-HFP).

In some embodiments, the drainage channels are non-woven fabrics of polymeric fibers. In some embodiments, the non-woven drainage channels are formed by nanofibers by gas jet process or electrospinning process.

In some embodiments, the drainage channels are woven fabrics selected from plain weaves, twill weaves, satin weaves, and dutch weaves.

In some embodiments, the drainage channels are formed of fibers of from 1 micron to 2 millimeters (mm) in diameter. In some embodiments, the drainage channels are formed of fibers of from 10 microns to 1 millimeter (mm) in diameter, in other embodiments, from 100 microns to 800 microns in diameter, in other embodiments, from 200 microns to 600 microns in diameter, and, in other embodiments, from 300 microns to 500 microns in diameter. In some embodiments, the drainage channels are formed of fibers of less than 2 mm in diameter. In some embodiments, the drainage channels are formed of fibers of 1 mm or less in diameter, in other embodiments, of 800 microns or less in diameter, in other embodiments, of 600 microns or less in diameter, and, in other embodiments, of 500 microns or less in diameter. In some embodiments, the drainage channels are formed of fibers of 1 micron or more in diameter, in other embodiments, of 10 microns or more in diameter, in other embodiments, of 100 microns or more in diameter, and, in other embodiments, of 300 microns or more in diameter.

Porosity is the measure of the void, or empty, space within a material. The higher the porosity of a medium, the easier it is for a gas to flow therethrough. A higher porosity also generally results in lower pressure drop. However, a higher porosity also generally reduces the coalescing ability of the medium. The porosity of a medium can be manipulated based on these factors. Coalescing filters of the present invention have drainage channels having higher porosity than a coalescing filter medium that is also contained in the coalescing filter.

In some embodiments, the coalescing filter medium has a porosity of from 0.5 or more to 0.99 or less. In other embodiments, the coalescing filter medium has a porosity of from 0.8 or more to 0.96 or less, in other embodiments, of from 0.9 or more to 0.95 or less, and in other embodiments of from 0.94 or more to 0.95 or less. In some embodiments, the coalescing filter medium has a porosity of 0.5 or greater. In other embodiments, the coalescing filter medium has a porosity of 0.8 or greater, in other embodiments, 0.9 or greater, in other embodiments, 0.94 or greater, and, in other embodiments, 0.95 or greater. In some embodiments, the coalescing filter medium has a porosity of 0.99 or less. In other embodiments, the coalescing filter medium has a porosity of 0.95 or less, in other embodiments, 0.94 or less, in other embodiments, 0.9 or less, and, in other embodiments, 0.8 or less.

In one or more embodiments, a coalescing filter medium has a pore size opening of from 10 microns or more to 20 microns or less. In one or more embodiments, a coalescing filter medium has a pore size opening of about 20 microns. In one or more embodiments, a coalescing filter medium has a pore size opening of 20 microns or less.

In some embodiments, the drainage channels have a porosity of from 0.5 or more to 0.99 or less. In other embodiments, the drainage channels have a porosity of from 0.7 or more to 0.95 or less, in other embodiments, of from 0.75 or more to 0.9 or less, and in other embodiments of from 0.8 or more to 0.85 or less. In some embodiments, the drainage channels have a porosity of 0.5 or greater. In other embodiments, the drainage channels have a porosity of 0.7 or greater, in other embodiments, 0.75 or greater, in other embodiments, 0.8 or greater, and, in other embodiments, 0.85 or greater. In some embodiments, the drainage channels have a porosity of 0.99 or less. In other embodiments, the drainage channels have a porosity of 0.95 or less, in other embodiments, 0.9 or less, and, in other embodiments, 0.85 or less.

In one or more embodiments, a drainage channel has a pore size opening of from 200 microns or more to 1000 microns or less. In one or more embodiments, a drainage channel has a pore size opening of about 200 microns. In one or more embodiments, a drainage channel has a pore size opening of 200 microns or more.

The surface energy, or wettability, of the fibers in coalescing filter medium controls the performance of a coalescing filter. High surface energy fibers capture and hold onto droplets, slowing the droplets movement through the filter, which increases coalescence between drops. Low surface energy fibers allow drops to slip through the filter with little or no hindrance, but do not contribute significantly to the coalescence. The present invention provides coalescing filters made of high surface energy, or high wettability, fibers with layers of low surface energy, or low wettability, fibers as drainage channels. For a given media, wettability is different for different liquids and is inversely related to contact angle.

In some embodiments, the coalescing filter medium is chosen such that, with respect to the liquid to be removed from the gas stream, the contact angle of the liquid on the material forming the coalescing filter medium is from 0 deg or more to 90 deg or less. In other embodiments, such contact angle is from 0 deg or more to 60 deg or less, in other embodiments, from 0 deg or more to 45 deg or less, and in other embodiments, from 0 deg or more to 30 deg or less. In some embodiments, such contact angle is 90 deg or less. In other embodiments, such contact angle is 60 deg or less, in other embodiments, 45 deg or less, in other embodiments, 30 deg or less, and, in other embodiments, 15 deg or less.

As noted, the wettability of the liquid on the material of the drainage channels is lower than that of the liquid on the coalescing filter medium. In some embodiments, the material of the drainage channels is chosen such that, with respect to the liquid to be removed from the gas stream, the contact angle of the liquid on the material forming a drainage channel is from 90 deg or more to 180 deg or less. In other embodiments, such contact angle is from 110 deg or more to 180 deg or less, in other embodiments, from 130 deg or more to 180 deg or less, and in other embodiments, from 150 deg or more to 180 deg or less. In other embodiments, such contact angle is 90 deg or greater, in other embodiments, 110 deg or greater, in other embodiments, 130 deg or greater, and, in other embodiments, 150 deg or greater.

The surface tension of the liquid to be coalesced has an influence on the formation of the droplets within a coalescing filter. The viscosity of the liquid also affects droplet formation. These properties are generally known in the art Coalescing filters of the present invention can be designed to filter any gas known to one skilled in the art. This gas can also contain any liquid that can be coalesced within a coalescing filter.

The gas flowing through the coalescing filter and the liquid to be coalesced will both vary based on the application and use of the coalescing filter. The gas flowing through the coalescing filter may be chosen from air, water vapor, process gases, exhaust gases, and mixtures thereof. Gases may be chosen from steam, nitrogen, engine exhaust, essentially any gas containing liquid aerosol, and mixtures thereof.

The liquid to be collected by the coalescing filter may be chosen from oils, water, melts, solvents, and mixtures thereof. Liquids may be chosen from lubricants, cleaning fluids, fuels, and mixtures thereof.

The coalescing filter is designed to be compatible with a chosen gas and liquid. The coalescing filter is designed such that the coalescing filter medium and drainage channel are not dissolved or chemically reacted by a chosen gas or liquid.

In one or more embodiments, the gas stream includes from 1 $mg/m^3$ or more to 1000 $mg/m^3$ or less liquid component. In other embodiments, the gas stream includes from 5 $mg/m^3$ or more to 500 $mg/m^3$ or less liquid component, in other embodiments, from 10 $mg/m^3$ or more to 300 $mg/m^3$ or less, and in other embodiments, from 20 $mg/m^3$ or more to 200 $mg/m^3$ or less liquid component. In other embodiments, the gas stream includes 5 $mg/m^3$ or greater liquid component, in other embodiments, 10 $mg/m^3$ or greater, and in other embodiments, 20 $mg/m^3$ or greater. In other embodiments, the gas stream includes 1000 $mg/m^3$ or less liquid component, in other embodiments, 500 $mg/m^3$ or less, and in other embodiments, 100 $mg/m^3$ or less.

Coalescing filters of the present invention can also be designed to handle any gas flow rate known to one skilled in the art. The gas flow rate affects droplet capture and droplet break-up. If the face velocity of a coalescing filter is too high, the small drops tend to not be captured and large drops tend to break into small drops. Face velocity (flow rate divided by filter area) is reduced by making the filter area larger.

The pressure drop across a coalescing filter is essentially the amount of energy that a gas loses as it travels across the filter. Therefore, a filter with a lower pressure drop requires less energy in order to maintain a certain flow across the filter. As described above, the less space that is occupied by a liquid in a coalescing filter, the lower the pressure drop of that filter. In one or more embodiments, a coalescing filter has a pressure drop of from 0.5 psi or more to 5 psi or less. In other embodiments, a coalescing filter has a pressure drop of 2 psi or more. In other embodiments, a coalescing filter has a pressure drop of 1 psi or less.

Coalescing filters of the present invention increase capture efficiency while maintaining pressure drop characteristics or improving pressure drop characteristics. The performance of a filter having drainage channels is better than a filter devoid of drainage channels. Merely by way of example, the coalescing filters can be applied in industrial dehumidification, cabin air filtration, and automobile exhaust filtration. They can also be used to remove liquid drops from metal cutting and agricultural processes.

In one particular embodiment, the coalescing filter medium is a mass of glass microfiber fibers of from 2 nm to 5 nm filament thickness. The coalescing filter medium has an average pore size opening of about 15 nm and a contact angle of from 0 deg to 5 deg relative to the liquid to be coalesced. At least one drainage channel is formed in the coalescing filter medium and extends at an angle of from 42 degrees or greater to 48 degrees or less relative to a direction orthogonal to gravity. The drainage channel has a pore size opening of about 500 μm and a contact angle of from 90 deg to 135 deg relative to the liquid to be coalesced.

In light of the foregoing, it should be appreciated that the present invention significantly advances the art by providing an improved coalescing filter. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Example 1 Set-Up

In one example, the effect of surface energy of drainage channel is studied by using three different polymeric materials having high, intermediate and low surface energies in woven and nonwoven structures. These polymers are Nylon, Polypropylene and Teflon® respectively. The contact angles of these polymers were determined for water and Sullube 32® (Dow Chemical, Midland, Mich.) on a smooth flat surface as well as on the rough porous surface of the drainage channel woven mats. Along with Nylon, Polypropylene and Teflon® woven mesh drainage channels one additional drainage channel was made by electrospinning a layer of Nylon nanofibers onto the surface of a Teflon® mesh. The glass fibers hydrophilic and more oleophilic than Nylon, Polypropylene and Teflon®. The Nylon is hydrophilic and oleophilic while polypropylene is weakly hydrophobic and oleophobic. The Teflon® is hydrophobic and oleophobic.

Disc shaped filter media 0.06 m in diameter and 0.014 m in thickness were prepared by vacuum molding aqueous slurry of 2-5 μm diameter B-glass fibers and Megasol® S50 binder (Wesbond Corporation). The slurries were made by dispersing the fibers in 9 liters of water. Starch, 0.15 grams (Wesbond Corporation), and 5 milliliter of Megasol® S50 binder, were added to the slurry and the slurry was stirred for 10 minutes. The slurry was pulled through a cylindrical mold, using a gentle vacuum. The fibers were collected on a woven wire screen to form a filter cake. The filter cake was heated to remove excess moisture. The porosity, permeability, and hardness of the filter were measured using a special made pycnometer, a Fraizer Air Permeability Tester, and a durometer (ASTM D2240 type A, Rex Gauge Co., Buffalo Grove, Ill.), respectively. Multiple filter media were fabricated in this manner and the filter media having nearly the same properties were used to study the effects of wettability and surface energy on the performance of the filter medium.

Filter geometries were constructed by inserting woven and nonwoven drainage layers of different surface energy materials at 45 degrees downward inclination as shown in FIG. 1. Woven meshes of Teflon® (Dexmet Corporation), Polypropylene, (Spectrum Laboratories) and Nylon, (Dexmet Corporation) fibers were tested as low, intermediate, and high surface energy drainage channels. Furthermore, a composite mesh of nylon nanofibers (NF) electrospun onto a supporting Teflon® mesh was tested for comparing the effects of the nylon fiber size.

The polymeric woven meshes in these examples had 500 micron pore opening and 610 micron filament thickness. To construct the filters with 45° downward inclination drainage channels the glass microfiber filter media were cut at 45° and rectangular shaped drainage channel meshes were inserted physically touching face to face with the glass fiber sections of the filter media. The filter geometries were held together by a compressive force when assembled into the filter holder. All of the woven drainage channels were a one-sheet layer of Nylon, Polypropylene or Teflon® woven mesh and hence all had similar geometric properties. Properties of the glass fiber filter media and drainage channels are given in Table 1.

TABLE 1

Properties of filter media and drainage channels.

| Material | Fiber size (μm) | Average pore size (μm) | Thickness (μm) | Air permeability (m^2) |
|---|---|---|---|---|
| Glass | 2-5 | 15 | 14,000 | $2.05 \times 10^{-10}$ |
| Nylon | 610 | 500 | 610 | $3.39 \times 10^{-9}$ |
| Polypropylene | 610 | 500 | 610 | $5.67 \times 10^{-9}$ |
| Teflon ® | 610 | 500 | 610 | $8.67 \times 10^{-9}$ |
| Nylon (NF) + Teflon ® | 0.5 | 2.75 | 610* | $4.81 \times 10^{-10}$ |

(*Nylon nanofibers (NF) electrospun on Teflon ® mesh drainage channel had a very thin layer of nanofibers on Teflon ® mesh which did not have a measurable change in the thickness of the drainage channel.)

The contact angles of the drainage channel materials and glass fiber media were measured for water and Sullube 32® using a Krüss Easy Drop System DSA20 (Krüss USA, Mathews, N.C.) as listed in Table 2. Nylon, Polypropylene and Teflon® were melted onto a glass slide to form the smooth, flat surface. The oil contact angle was also measured directly on the fibrous porous materials that made up the drainage channels but the latter is more difficult to reproduce due to the effect of the roughness of the porous surface.

The water and oil contact angle on glass fiber media were similar indicating the filter media is hydrophilic and oleophilic in nature. The contact angles of the meshes were greater than the contact angles on the smooth flat surface suggesting that the overall surface tension was reduced when the drop surfaces spanned across pore openings and the portions of the drop surfaces were in contact with air in the pores and not in contact with the fiber material. This is explained by the Cassie-Baxter model of increase in contact angle due to surface roughness and the formation of a composite surface made up of trapped air underneath the irregular features of the surface.

TABLE 2

Surface energy of drainage channels

| | Water contact angle (deg) | | Sullube 32 ® contact angle (deg) | |
|---|---|---|---|---|
| Material | Smooth, flat surface | Fibrous, porous surface * | Smooth, flat surface | Fibrous, porous surface * |
| Glass fibers | ~0 | 2 | ~0 | 2 |
| Nylon | 52 | 60 | 4 | 6 |
| Polypropylene | 85 | 95 | 46 | 76 |
| Teflon ® | 120 | 135 | 95 | 125 |
| Nylon (NF) + Teflon ® | ~0 | 64 | ~0 | 56 |

(* Approximate values measured by large droplet on the porous surface. Measurements on porous surfaces are difficult to reproduce due to irregular way droplets contact the fibers and pores.)

The coalescence experiment test was set up by first setting up compressed air to be preconditioned by passing through a set of filters and a dehumidifier to remove particulates and moisture. Part of the conditioned air passed through a Laskin Nozzle to generate the aerosol. The aerosol was mixed with the main air stream upstream of the filter holder. Pressure drop and flow rate were measured throughout the experiment from start up to steady state. Aerosol concentration was monitored with a photometer (Air Techniques TDA 2G) and the drop size distribution was measured with a TSI3080 SMPS.

The oil used for all the experiments was Sullube 32® (DOW Chemical) which mainly consists of propylene glycol. The flow rate through the filter was controlled at a rate of 0.6 m/s. The pressure upstream of the filter medium was maintained at a constant 35 kPa. Steady state was obtained when the pressure drop and the photometer readings became steady. The filter media were weighed before and after the experiments to determine the oil saturation in the media (volume of oil per void volume).

Example 1 Results

Figure 3:
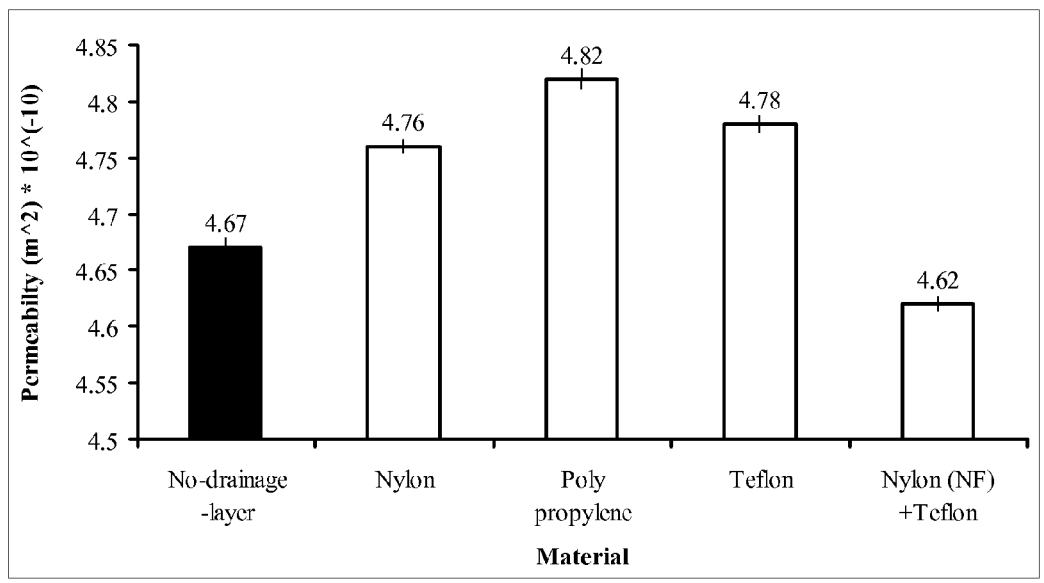
FIG. 3 is a graph showing the air permeability of filter geometries at no saturation.

All filter media were constructed in triplicate and the experimental results show the steady state values averaged over the three samples. The error bars in the plots indicate one standard deviation of the three averaged points. Prior to the filtration experiments, the permeabilities of the filters were measured, as plotted in FIG. 3. The permeability data show that the Nylon, Polypropylene, and Teflon drainage channel filters had small increases (less than 4%) in permeability over the no-drainage layer glass fiber media. These small increases were due to the presence of the drainage channels and their larger pore spaces. The media with the Nylon (NF)+Teflon drainage channels had a slight reduction in permeability most likely due to the very small pore openings of the nanofiber layer.

The rest of the data reported below are for filters at steady state conditions of the filter media at their final saturation levels of captured liquid. The drainage channel materials are plotted against capture efficiency, pressure drop, saturation, and quality factor in FIGS. 4, 5, 6 and 7 respectively.

In the figures, the drainage channel material is plotted on horizontal axis in the sequence of No-drainage-layer, Nylon, Polypropylene, Teflon® and Nylon (NF)+Teflon®. The first bar, marked "No-drainage-layer", is glass microfiber media only and does not have a drainage channel, and serves as the experimental control while the next three bars report experimental results for woven meshes of Nylon, Polypropylene, and Teflon® respectively. Each of these bars indicates results for filters equipped with three rectangular shaped drainage channels. The last bar marked as Nylon (NF)+Teflon® indicates the performance of filter media equipped with three composite drainage channels formed of an electrospun layer of Nylon nanofibers on a Teflon® mesh with the nylon nanofiber layer facing the incoming flow.

Figure 4:
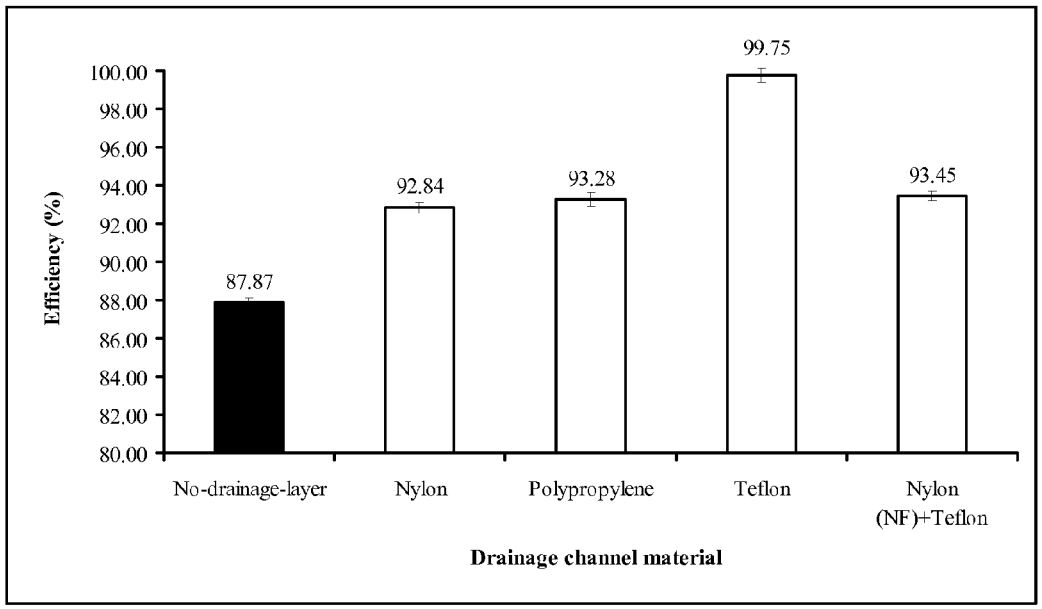
FIG. 4 is a graph showing the capture efficiency of filter geometries with various drainage channel materials.

The no-drainage channel filter media had capture efficiency of 87% as shown in FIG. 4. The capture efficiencies of the media with 45° inclined drainage channels were better than the filter with no drainage channels. The Teflon® drainage channel had the highest efficiency of 99%. The experimental results show the media with the 45° downward inclination drainage channels with varying surface energies had higher capture efficiencies compared to the glass fiber media with no drainage channel. Without being limited to this theory, one possibility for this is that the action of the drainage channels to remove liquid from the medium exposes more fiber for capture of incoming droplets.

The pressure drop data (FIG. 5) show greater variability between the different drainage channel materials. Nylon, Polypropylene and Teflon® woven drainage channel incorporated filters had lower pressure drops compared to the experimental control while the composite Nylon (NF)+Teflon® mesh had a higher pressure drop than the control.

The ideal comparison for the effects of pore and fiber sizes of the drainage channels would be to compare media with channels having exactly the same materials but with different fiber diameters and pore sizes. Comparison of the Nylon woven mat with the Nylon nanofiber layer serves this purpose, but the thin layer of Nylon nanofibers needed a structural support to hold it in place. Because the Teflon channel had the least resistance to flow at steady state it is concluded that in the composite drainage channels Nylon (NF)+Teflon® the fiber sizes and small pore sizes of nanofiber layer were the primary reason for the increase in pressure drop.

The Teflon® woven drainage channel had the lowest pressure drop among all the filters. Since the Nylon, Polypropylene and Teflon® woven drainage channels had similar fiber sizes and pore sizes, the primary factor for the reduced pressure drop is due to the lower surface energy of the Teflon to allow the coalesced enlarged drops in the glass fiber layers to drain more easily from the medium. This is supported by the measured saturation data shown in FIG. 6.

Figure 6:
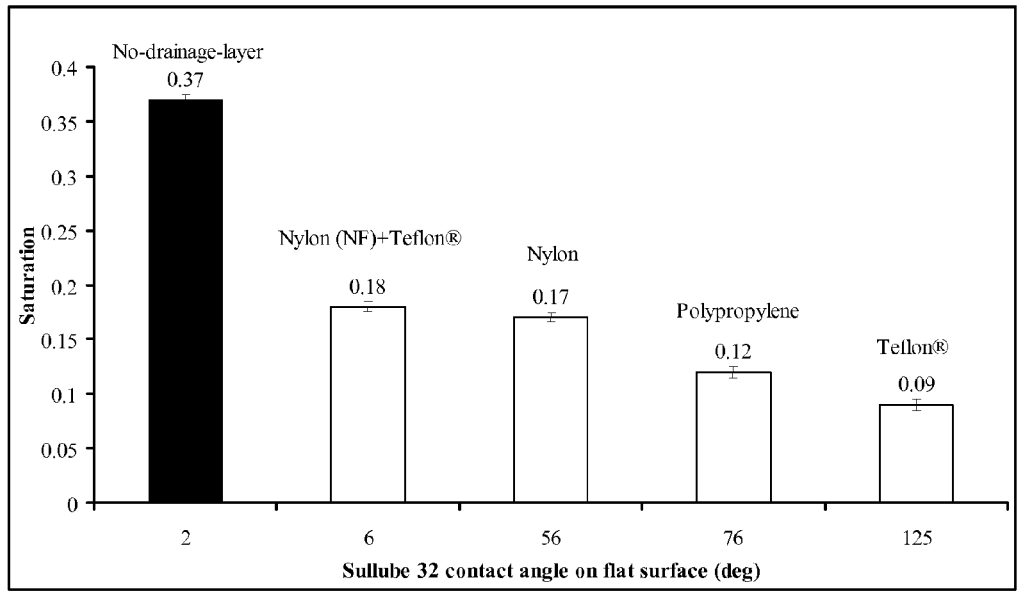
FIG. 6 is a graph showing the average saturation of filter geometries with various drainage channel materials.

The steady state saturations in FIG. 6 decrease as the surface energy of the drainage channels decrease. The composite layer drainage channel (Nylon (NF)+Teflon®) had similar saturation to that of the Nylon drainage channel filter.

Figure 5:
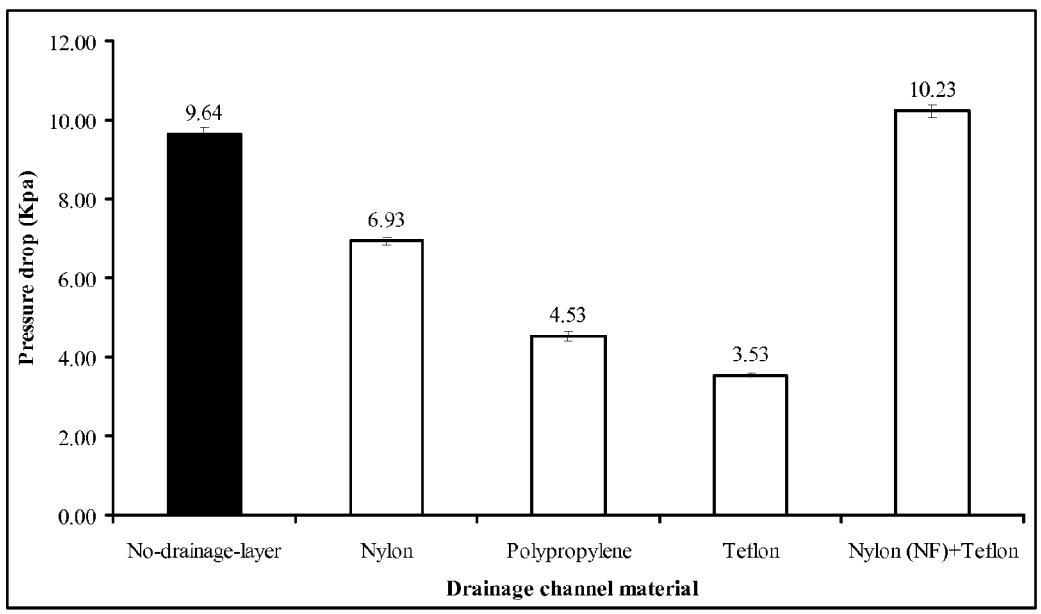
FIG. 5 is a graph showing the pressure drop of filter geometries with various drainage channel materials.
Figure 7:
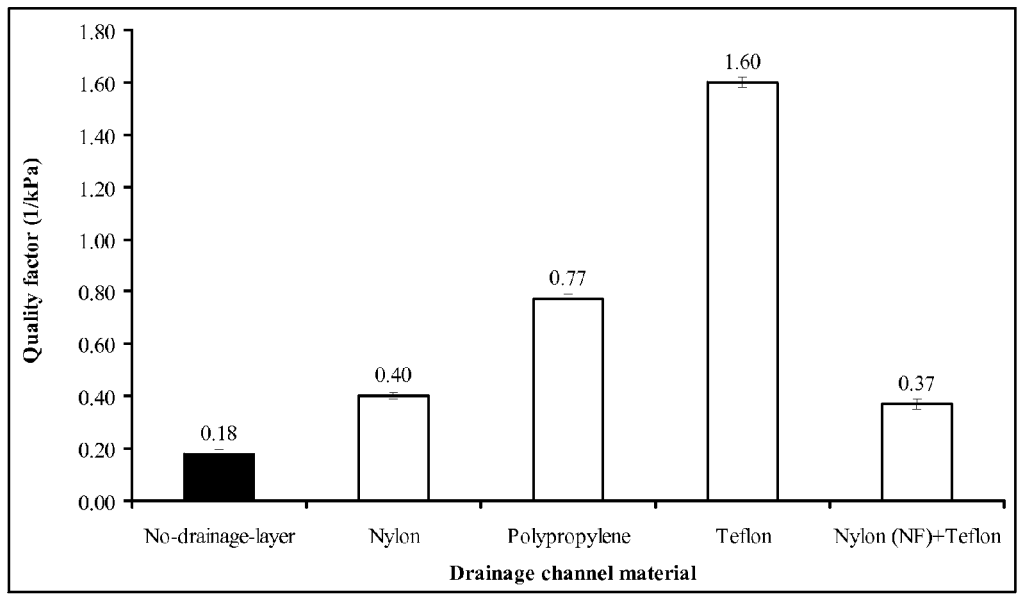
FIG. 7 is a graph showing the quality factor of filter geometries with various drainage channel materials.

The capture efficiency and the pressure drop data in FIGS. 4 and 5 were applied based on the above equations to calculate the quality factor (QF), as plotted in FIG. 7. The 45 degree filter geometries had higher capture efficiency and lower pressure than the control medium (except for the Nylon (NF)+Teflon® drainage channel). Hence, in FIG. 7, all of the filter geometries had higher quality factors than the control medium. Improvements in the quality factors of different drainage channel materials are summarized in Table 2. The improvement in quality factor is normalized by dividing the quality factor of the test sample by the quality factor of the control sample to obtain the relative quality factor (RQF):

$$RQF = \frac{QF}{QF_{Control}}$$

where the control medium is the no-drainage channel filter medium.

Figure 8:
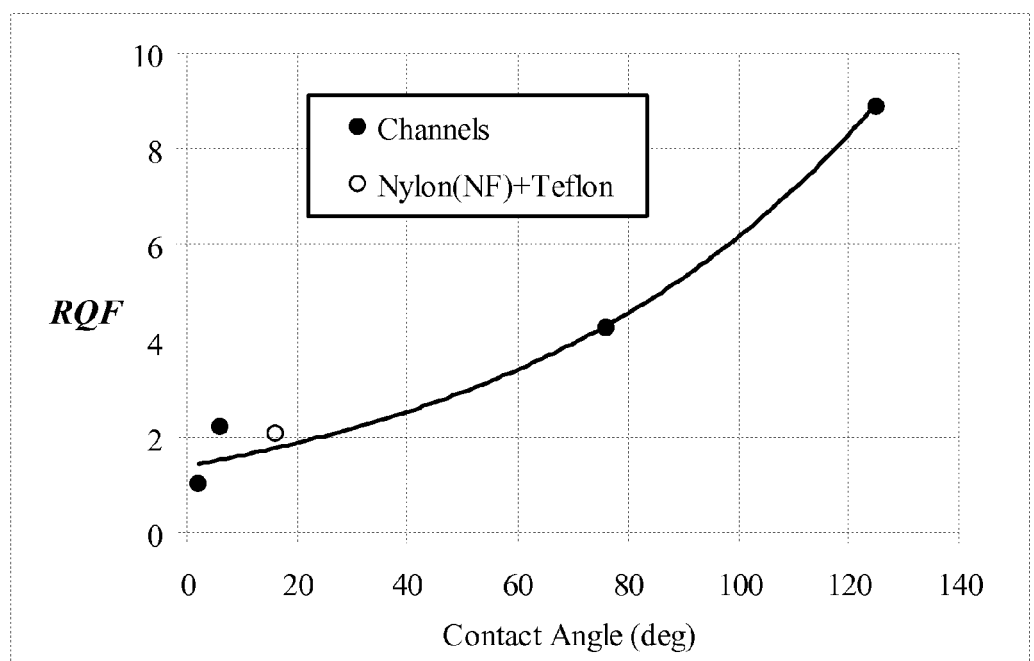
FIG. 8 is a graph showing the Relative Quality Factor (RQF) versus the Sullube 32® contact angle with the porous drainage channel material.

The RQF values are plotted in FIG. 8 as a function of the contact angle of the porous drainage channel. Knowing that contact angles of porous surfaces are difficult to reproduce, the intent of this plot is only to show the trend. The solid line is the trendline fitted to the data points excluding the media with the composite channel Nylon(NF)+Teflon, the latter having much smaller fibers than the others. FIG. 8 strongly shows higher contact angles correspond greater RQF. The Nylon (NF)+Teflon® filters had RQF of about 2 showing only a small relative improvement while the Teflon drainage channel media had an RQF of almost 9, which is a significant improvement in the performance as compared to the experimental control.

The general trend in the filter performance is the drainage channels with larger pores and lower surface energy than the control medium results in lower saturation and pressure drop. The lowest pressure drop was obtained for the 45° inclined drainage channels made of Teflon® woven mesh. In the 45 degree drainage channel geometry, the glass fiber media captures and coalesces the aerosol droplets into enlarged drops. The enlarged drops drain from the medium with aid of the drainage channels. The media with lowest surface energy fibers in the drainage channel had the lowest liquid saturation and corresponding lowest pressure drop.

Various modifications and alterations that do not depart from the scope and spirit of this invention will become apparent to those skilled in the art. This invention is not to be duly limited to the illustrative embodiments set forth herein.

What is claimed is:

1. A coalescing filter comprising:
   a coalescing filter medium being a first woven or non-woven fiber construct and having an entrance face, an exit face, a pore size, a surface energy, and a porosity of 0.5 or greater;
   a drainage channel extending through said coalescing filter medium at a downward angle in the range of from 30 degrees or more to 50 degrees or less relative to the direction from said entrance face to said exit face, said drainage channel being a second woven or non-woven fiber construct having a pore size greater than the pore size of said coalescing filter medium, a surface energy that is lower than the surface energy of said coalescing filter medium, and a porosity of 0.85 or greater, the porosity of said drainage channel being greater than the porosity of said coalescing filter medium.

2. The coalescing filter of claim 1, wherein the drainage channel extends at a downward angle from 42 degrees or more to 48 or less degrees.

3. The coalescing filter of claim 2, wherein the drainage channel extends at a downward angle of 44 or greater to 46 or less degrees.

4. The coalescing filter of claim 1, wherein the coalescing filter medium has an average pore size opening of 20 microns or less and the drainage channel has an average pore size opening of from 200 microns or more.

5. The coalescing filter of claim 4, wherein the coalescing filter medium has an average pore size opening of from 10 microns or more to 20 microns or less and the drainage channel has an average pore size opening of from 200 microns or more to 1000 microns or less.

6. The coalescing filter of claim 1, wherein the coalescing filter is to filter a liquid from a gas stream and the surface energy of said drainage channel is such that the liquid to be separated has a contact angle with the material of the drainage channel of 90 degrees or more.

7. The coalescing filter of claim 1, wherein the coalescing filter is to filter a liquid from a gas stream and the surface energy of said drainage channel is such that the liquid to be separated has a contact angle with the material of the drainage channel of 110 degrees or more.

8. The coalescing filter of claim 7, wherein the coalescing filter is to filter a liquid from a gas stream and the surface energy of said coalescing filter medium is such that the liquid to be separated has a contact angle with the material of the coalescing filter medium of 60 degrees or less.

9. The coalescing filter of claim 1, wherein the coalescing filter comprises a plurality of drainage channels.

10. The coalescing filter of claim 8, wherein any cross section taken in an orthogonal direction from said entrance face to said exit face cuts through at least one drainage channel.

11. The coalescing filter of claim 1, wherein the filter medium is made from glass fibers.

12. A method of filtering a liquid component from a gas stream, the method comprising the steps of:
   providing a coalescing filter across a path of travel of a gas stream containing a liquid component, the coalescing filter including:
      a coalescing filter medium being a first woven or non-woven fiber construct and having an entrance face, an exit face, a porosity of 0.5 or greater, and a surface energy,
      a drainage channel in said coalescing filter medium, said drainage channel being a second woven or non-woven fiber construct having a pore size greater than the pore size of said coalescing filter medium, a surface energy that is lower than the surface energy of said coalescing filter medium, and a porosity of 0.85 or greater, the porosity of said drainage channel being greater than the porosity of said coalescing filter medium,
      wherein the drainage channel extends at a downward angle relative to a direction orthogonal to gravity, said downward angle being in a range of from 30 degrees or more to 50 degrees or less;
   coalescing said liquid component in said coalescing filter medium, and
   draining said liquid component through said drainage channel.

13. The method of claim 12, wherein said coalescing filter medium has a higher wettability of said liquid component than said drainage channel.

14. The method of claim 12, wherein the contact angle of said drainage channel to a coalesced droplet of said liquid component is larger than the contact angle of said coalescing filter medium to a coalesced droplet of said liquid component.

15. The method of claim 12, wherein said drainage channel has a liquid contact angle with said liquid component of 90 degrees or more.

16. The method of claim 15, wherein said drainage channel has a liquid contact angle with said liquid component of 110 degrees or more.

17. The method of claim 12, wherein said drainage channel is hydrophobic and further wherein said coalescing filter medium is hydrophilic.

18. A coalescing filter comprising:
   a coalescing filter medium being a woven or non-woven fiber construct and having an entrance face, an exit face, a pore size, a surface energy, and a porosity of 0.5 or greater;
   a drainage channel extending through said coalescing filter medium at a downward angle in the range of from 30 degrees or more to 50 degrees or less relative to the direction from said entrance face to said exit face, said drainage channel having a surface energy that is lower than the surface energy of said coalescing filter medium, and a porosity of 0.85 or greater, the porosity of said drainage channel being greater than the porosity of said coalescing filter medium.

* * * * *